(12) United States Patent
Kegasawa et al.

(10) Patent No.: US 7,674,412 B2
(45) Date of Patent: Mar. 9, 2010

(54) METHOD AND APPARATUS FOR FORMING RESIN FILM

(75) Inventors: Tadahiro Kegasawa, Fujinomiya (JP); Ryuichi Katsumoto, Fujinomiya (JP); Masanori Takase, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 317 days.

(21) Appl. No.: 10/725,053

(22) Filed: Dec. 2, 2003

(65) Prior Publication Data

US 2004/0108621 A1 Jun. 10, 2004

(30) Foreign Application Priority Data

Dec. 3, 2002 (JP) ............................. 2002-350902

(51) Int. Cl.
*B29C 47/12* (2006.01)
*B29C 47/14* (2006.01)
*B32B 37/00* (2006.01)

(52) U.S. Cl. ............... 264/171.1; 264/167; 264/173.11; 264/173.12; 264/173.16; 264/173.17; 264/177.16; 264/146; 264/40.7; 264/209.7; 264/210.5; 425/113; 425/133.5; 425/461

(58) Field of Classification Search ..................... None
See application file for complete search history.

(56) References Cited

U.S. PATENT DOCUMENTS

| 3,715,420 | A | * | 2/1973 | Kiyono et al. ......... 264/173.19 |
| 3,825,383 | A | * | 7/1974 | Hoagland et al. ........ 425/133.5 |
| 3,909,170 | A |   | 9/1975 | Riboulet et al. |
| 4,265,693 | A | * | 5/1981 | Nishimoto et al. .......... 156/218 |
| 4,272,312 | A | * | 6/1981 | Thompson ............. 156/244.11 |
| 4,348,346 | A | * | 9/1982 | Thompson .................. 264/146 |
| 4,556,376 | A | * | 12/1985 | Sievers et al. ............ 425/133.5 |
| 4,731,004 | A | * | 3/1988 | Wenz, Jr. ................. 425/133.5 |
| 4,784,815 | A |   | 11/1988 | Cloeren et al. |

(Continued)

FOREIGN PATENT DOCUMENTS

JP 64-064822 A 3/1989

(Continued)

OTHER PUBLICATIONS

European Search Report dated Aug. 10, 2009.

*Primary Examiner*—Jeffrey Wollschlager
(74) *Attorney, Agent, or Firm*—Sughrue Mion, PLLC

(57) ABSTRACT

The apparatus is for forming a resin film from a resin for a middle portion to form a resin film main body of the resin film and a resin for edge portions to form both side edge portions in a crosswise direction of the resin film. The apparatus comprises: a feed block which includes a joining part where the resin for the middle portion in a molten state and the resin for the edge portions in a molten state are joined in such a manner as to enclose both side edges in the crosswise direction of the resin film main body with the resin for the edge portions; and an extruding die through which the joined resins are extruded to form the resin film. Thus, a method and apparatus for forming the resin film can avoid the inclusion of the resin for the middle portion in the trimmed-off selvages while preventing the film separation of the resins for the middle portion and for the edge portions, and therefore, increase the recyclability and the productivity of the resin film.

5 Claims, 8 Drawing Sheets

U.S. PATENT DOCUMENTS

| | | | |
|---|---|---|---|
| 5,120,484 A * | 6/1992 | Cloeren | 264/173.12 |
| 5,147,195 A * | 9/1992 | Cloeren | 425/133.5 |
| 5,451,357 A | 9/1995 | Cloeren | |
| 5,705,111 A * | 1/1998 | Blemberg et al. | 264/173.13 |
| 5,716,570 A * | 2/1998 | Peiffer et al. | 264/146 |
| 6,203,742 B1 * | 3/2001 | Kegasawa et al. | 264/173.16 |
| 6,461,138 B2 * | 10/2002 | Kegasawa et al. | 425/133.5 |
| 6,896,832 B2 * | 5/2005 | Kegasawa et al. | 264/173.12 |
| 2004/0163769 A1 * | 8/2004 | Kegasawa et al. | 156/497 |

FOREIGN PATENT DOCUMENTS

| | | |
|---|---|---|
| JP | 02-018023 A | 1/1990 |
| JP | 6-91719 A | 4/1994 |
| JP | 07-076038 A | 3/1995 |
| JP | 2002-240126 A | 8/2002 |

* cited by examiner

METHOD AND APPARATUS FOR FORMING RESIN FILM

BACKGROUND OF THE INVENTION

1. Field of the Invention

The present invention relates to a method and apparatus for forming a resin film, in particular, to a method and apparatus for forming a resin film in which a resin for use in the edge portion of the resin film is applied to both side edges in the crosswise direction of the resin film main body, which is formed of a resin for use in the middle portion of the resin film, at the time the resins in the molten state are extruded through an extruding die to form the resin film.

2. Description of the Related Art

In a resin film having been extruded through an extruding die, its selvages (both side edges in the crosswise direction of the resin film) are usually trimmed off in the post-processing. When the resin film is formed of a resin hard to recycle or poor in thermal stability, the trimmed-off selvages cannot be recycled, which leads to decrease in the yield of the resin film. Hence, in order to make possible the recycling of resin films, there have been proposed a technique for forming a resin film in which a resin for use in the edge portion of the resin film is applied to both side edges in the crosswise direction of the resin film main body (the portion of the resin film left after trimming off its selvages and to be an end product), which is formed of a resin for use in the middle portion of the resin film. For example, when forming the resin film main body of a resin poor in thermal stability, a resin for the edge portions excellent in thermal stability is applied to both side edges of the main body and then the resin for the edge portions is trimmed off as the selvages. This allows the recycling of resin films and the improvement in productivity, because the trimmed-off resin for the edge portions is hard to subject to heat deterioration even when it is used repeatedly.

However, the techniques still have disadvantages in that when the physical properties of the resins for the middle portion and for the edge portions of a resin film are different or the film forming condition such as applying condition is different, the resins are likely to separate from each other or the boundary between them is likely to be in disorder. If the boundary is in disorder, the proportion of the inclusion of the resin for the middle portion to the trimmed-off selvages becomes large, which causes not only the deterioration of the resin film recyclability, but also the decrease in productivity, due to the decrease in the portion as a resin film main body.

As a measure to prevent the occurrence of the above problems, Japanese Patent Application Publication No. 2002-240126 discloses a method to prevent the film separation of the resin for the edge portions and the resin for the middle portion by wrapping up the former in the latter. However, this has the disadvantage in that, since the resin for the edge portions is wrapped up in the resin for the middle portion, the resin for the middle portion accounts for a larger part of the resin of the trimmed-off selvages than the resin for the edge portions, causing the deterioration in not only recyclability but also productivity. In other words, in order to increase the recyclability and productivity of resin films, it is important to arrange the resins for the edge portions and for the middle portion in such a manner as to avoid their mingling as much as possible when trimming off the selvages of the resin film, and furthermore, it is important to make their boundary in order and their boundary line clear. It is necessary to avoid the film separation of the two resins while satisfying the above requirements.

Further, Japanese Patent Application Publication No. 1-64822 discloses an apparatus for forming such kind of resin film, which adopts a detachable assembly. Still further, Japanese Patent Application Publication No. 7-76038 discloses an apparatus for forming such kind of resin film, in which a resin for the edge portions of a resin film and a resin for the middle portion of the resin film are layered in the crosswise direction in an extruding die. However, even with these apparatuses, the problems of the film separation of the resins and the disorder at the boundary between the resins cannot be resolved.

SUMMARY OF THE INVENTION

The present invention has been made in the light of the above situation. Accordingly, the object of the present invention is to provide a method and apparatus for forming a resin film which can avoid the inclusion of the resin for the middle portion of the resin film in the trimmed-off selvages while preventing the film separation of the resins for the middle portion and for the edge portions, and therefore, increase the recyclability and the productivity of the resin film.

In order to attain the above-described object, the present invention is directed to a method of forming a resin film from a resin for a middle portion to form a resin film main body of the resin film and a resin for edge portions to form both side edge portions in a crosswise direction of the resin film, the method comprising the steps of: joining the resin for the middle portion in a molten state and the resin for the edge portions in a molten state in such a manner as to enclose both side edges in the crosswise direction of the resin film main body with the resin for the edge portions; and extruding the joined resins through an extruding die to form the resin film.

Joining the resins for the middle portion and for the edge portions in such a manner as to enclose both side edges in the crosswise direction of the resin film main body with the resin for the edge portions. (herein after referred to as "the joining method of the present invention") can reduce the disorder at the boundary between the resins for the middle portion and for the edge portion, while preventing the film separation of the two resins. This makes it possible to avoid the inclusion of the resin for the middle portion in the trimmed-off selvages as much as possible, which in turn increases the recyclability of the selvages, and hence the yield and the productivity of the product.

Preferably, a degree of enclosing the resin for the middle portion with the resin for the edge portions is adjusted according to a difference in Melt Flow Rate (MFR) between the resins. Generally, the larger the difference in MFR between the resins for the middle portion and for the edge portions becomes, the more the film separation of the two resins is apt to occur; therefore, when the difference in MFR is larger, the degree of enclosing is required to be higher. Conversely, when the difference in MFR is small, even if the degree of enclosing is lowered, the film separation does not occur between the resins. Accordingly, the degree of enclosing which reflects the difference in MFR between the resins for the middle portion and for the edge portions can be achieved by changing the degree according to the difference in MFR between the two resins. Doing this avoids the unnecessary inclusion of the resin for the middle portion in the trimmed-off selvages, and moreover, prevents the film separation of the two resins reliably. In this case, when the difference between the resins for the middle portion and for the edge portions is expressed in terms of MFR ratio, preferably the MFR ratio is in the range of 0.5 to 2. This is because if the MFR ratio is as large as more than 2, the film separation may sometimes occur between the resins even with the joining method of the present invention.

The term "Melt Flow Rate (MFR)" herein used means the amount of a thermoplastic resin, by gram-weight, extruded through an orifice of 2.1 mm in diameter and 8 mm in length for 10 minutes when a force of 2310 g (44 pis) is applied to the resin at 230° C. (for the measuring method, refer to JIS K 7210, ASTMD 1238).

Preferably, a degree of enclosing the resin for the middle portion with the resin for the edge portions is adjusted according to a difference in extrusion rate between the resins. Generally, the larger the difference in extrusion rate between the resin for the middle and the resin for the edge portions becomes, the more the disorder is likely to occur at the boundary between the resins. However, if the degree of enclosing is increased with the increase in the difference in extrusion rate, the disorder at the boundary can be reduced. Conversely, when the difference in extrusion rate is small, even if the degree of enclosing is lowered, the disorder does not occur at the boundary between the resins. Accordingly, the degree of enclosing which reflects the difference in extrusion rate between the resins for the middle portion and for the edge portions can be achieved by changing the degree according to the difference in extrusion rate between the two resins. Doing this avoids the unnecessary inclusion of the resin for the middle portion in the trimmed off selvages, and moreover, reduces the disorder at the boundary between the two resins reliably. In this case, when the difference between the resins for the middle portion and for the edge portions is expressed in terms of extrusion rate ratio, preferably the extrusion rate ratio is 0.2 or less. This is because if the extrusion rate ratio is as large as more than 0.2, not only the film separation may sometimes occur between the resins, but also the disorder is more likely to occur at the boundary between the resins even with the joining method of the present invention. More preferably, the degree of enclosing is changed according to the two factors: the difference in extrusion rate; and the difference in MFR.

Preferably, a degree of enclosing the resin for the middle portion with the resin for the edge portions is adjusted according to a difference in resin temperature between the resins. Generally, the larger the difference in resin temperature between the resins for the middle portion and for the edge portions becomes, the more the film separation of the two resins is apt to occur; therefore, when the difference in resin temperature is larger, the degree of enclosing is required to be higher. Conversely, when the difference in resin temperature is small, even if the degree of enclosing is lowered, the film separation does not occur between the resins. Accordingly, the degree of enclosing which reflects the difference in resin temperature between the resins for the middle portion and for the edge portions can be achieved by changing the degree according to the difference in resin temperature between the two resins. Doing this avoids the unnecessary inclusion of the resin for the middle portion in the trimmed off selvages, and moreover, prevents the film separation of the two resins reliably. In this case, when the difference between the resins for the middle portion and for the edge portions is expressed in terms of resin temperature ratio, preferably the resin temperature ratio is in the range of 0.8 to 1.2. This is because if the resin temperature ratio is outside the above range, not only the film separation may sometimes occur between the resins, but also the disorder is more likely to occur at the boundary between the resins even with the joining method of the present invention. More preferably, the degree of enclosing is changed according to the three factors: the difference in resin temperature; the difference in MFR; and the difference in amount of resin supplied.

Preferably, a degree of enclosing the resin for the middle portion with the resin for the edge portions is adjusted according to a width of the resin film. Generally, the larger the width of the resin film becomes, the larger the disorder becomes at the boundary between the resins. However, if the degree of enclosing is increased with the increase in the width of the resin film, the disorder at the boundary can be reduced. Conversely, when the width of the resin film is small, even if the degree of enclosing is not increased, the disorder does not occur at the boundary between the resins. Accordingly, the degree of enclosing which reflects the width of the resin film can be achieved by changing the degree according to the width of the resin film. Doing this avoids the unnecessary inclusion of the resin for the middle portion in the trimmed off selvages, and moreover, reduces the disorder at the boundary between the two resins reliably. In this case, preferably the width of the resin film is 5 meters or less. This is because if the width is more than 5 meters, the disorder is more likely to occur at the boundary between the resins. More preferably, the degree of enclosing is changed according to the four factors: the width of the resin film, the difference in resin temperature, the difference in MFR and the difference in extrusion rate.

In order to attain the above-described object, the present invention is also directed to an apparatus for forming a resin film from a resin for a middle portion to form a resin film main body of the resin film and a resin for edge portions to form both side edge portions in a crosswise direction of the resin film, the apparatus comprising: a feed block which includes a joining part where the resin for the middle portion in a molten state and the resin for the edge portions in a molten state are joined in such a manner as to enclose both side edges in the crosswise direction of the resin film main body with the resin for the edge portions; and an extruding die through which the joined resins are extruded to form the resin film.

According to the present invention, the disorder at the boundary between the resins for the middle portion and for the edge portions is decreased while preventing the film separation of the two resins. Accordingly, it becomes possible to avoid the inclusion of the resin for the middle portion in the trimmed off selvages as much as possible, which in turns increases the recyclability of the selvages, and hence the yield and the productivity of the product.

Preferably, a trunk flow path through which the resin for the middle portion flows and a pair of branch flow paths through which the resin for the edge portions flows are joined at the joining part in the feed block; and a cross-sectional shape of the joining part is formed to allow the side edges of the resin film main body to be enclosed with the resin for the edge portions. This is a preferred example of construction for the feed block with which the side edges of the resin film main body are enclosed with the resin for the edge portions. The term "cross-sectional shape" herein used means the shape of the cross section perpendicular to the direction of the flow of the resins which flow through the joining part.

Preferably, the feed block is adapted to be detachably provided with any one of a plurality of joining part blocks having respective joining parts different in degree of enclosing the side edges of the resin film main body with the resin for the edge portions; and one of the plurality of joining part blocks which specifies a joining configuration depending on condition under which the resin film is formed is attached to the feed block exchangeably for another of the plurality of joining part blocks.

According to the present invention, since the feed block is so constructed that any one of the joining part blocks, which specify the joining configuration, is exchangeable for another depending on the condition under which the resin film is formed, even if the condition, such as physical properties of the resin for the middle portion and the resin for the edge portions and the applying condition of the same is changed, it is only necessary to exchange the joining part block for a suitable one. Thus, resin films are very conveniently formed.

Preferably, the condition under which the resin film is formed includes at least one of a difference in MFR, an extrusion rate and resin temperature between the resin for the middle portion and the resin for the edge portions and a width of the resin film. This allows the feed block having the suitable joining part to be selected and used depending on the factors which affect the film separation of the resin for the middle portion and the resin for the edge portions and the disorder occurring at the boundary between the two resins.

BRIEF DESCRIPTION OF THE DRAWINGS

The nature of the present invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

In the following, preferred embodiments of the method and apparatus of forming a resin film in accordance with the present invention will be described in detail with reference to the accompanying drawings.

Figure 1:
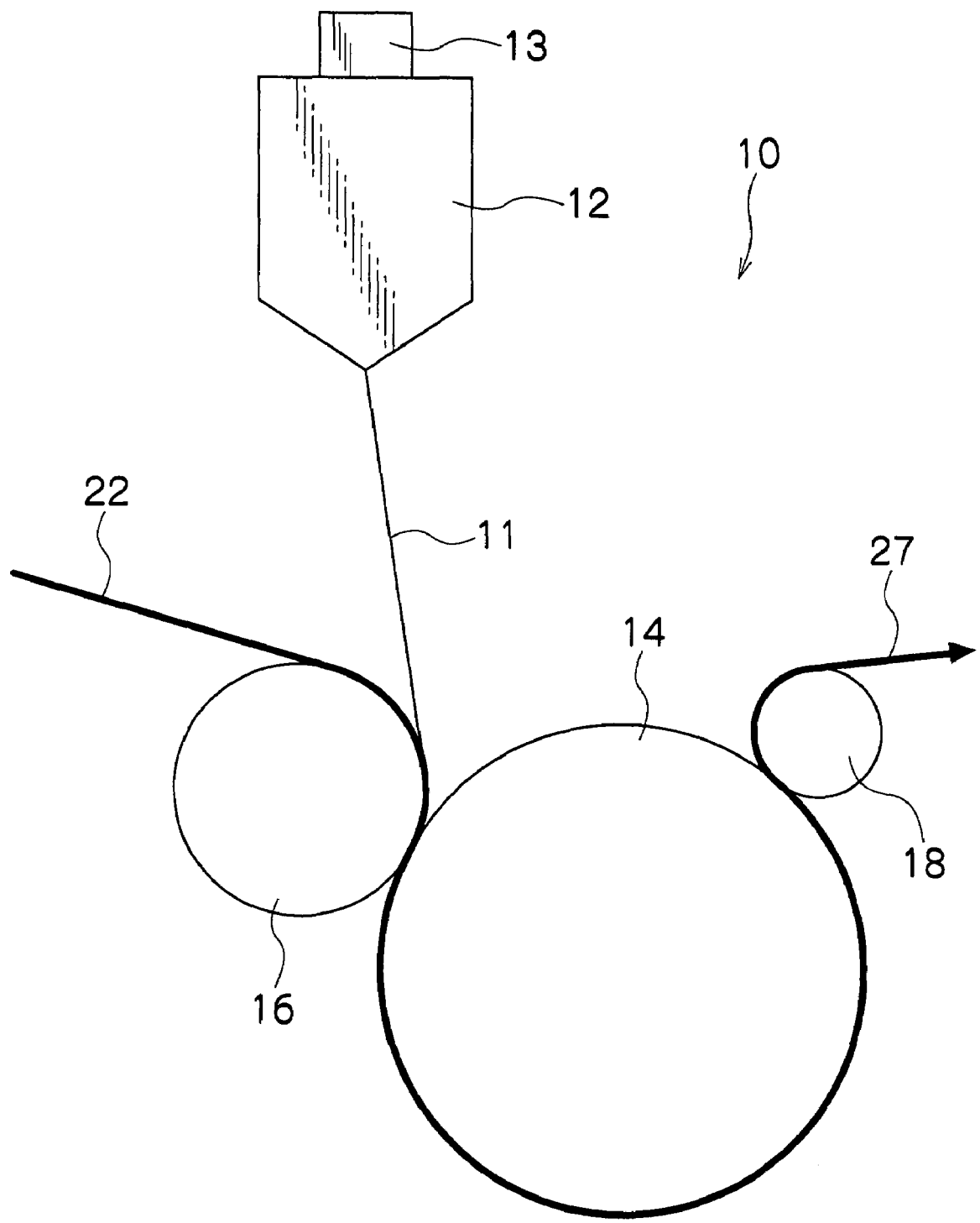
FIG. 1 is a general block diagram of an apparatus for forming a resin film according to an embodiment of the present invention.

FIG. 1 is a general block diagram of an apparatus 10 for forming a resin film according to an embodiment of the present invention. The apparatus will be described taking the case where a film-like laminate 27 is formed by laminating a support 22 with a resin film 11.

As shown in FIG. 1, below an extruding die 12 with a feed block 13, through which resins in the molten state are extruded so that the resin film 11 is formed, a cooling roller 14 and a nip roller 16 are arranged adjacent to and parallel with each other; in addition, on the opposite side of the nip roller 16 across the cooling roller 14, a film detaching roller 18 is arranged adjacent to and parallel with the cooling roller 14. The resin film 11 extruded through the extruding die 12 is applied to the web-like support 22 conveyed from the upstream, runs through between the cooling roller 14 and the nip roller 16 and between the cooling roller 14 and the film detaching roller 18 while kept in contact with the circumference of the cooling roller 14, and is detached from the cooling roller 14 at the position of the film detaching roller 18. Thus, the film-like laminate 27 is produced. As the substrate 22, paper, resin or metal can be used depending on the film-like laminate 27 required. As the resin of which the resin film is formed, known thermoplastic resins, for example, polyolefin resins such as polyethylene and polypropylene can be used.

Figure 2B:
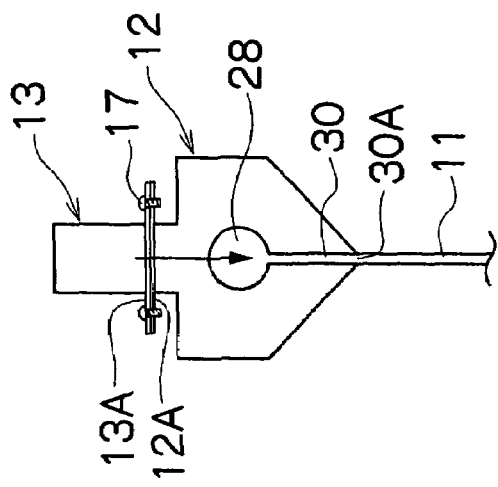
FIGS. 2(a) and 2(b) are front and side elevations, respectively, illustrating an extruding die with a feed block.
Figure 2A:
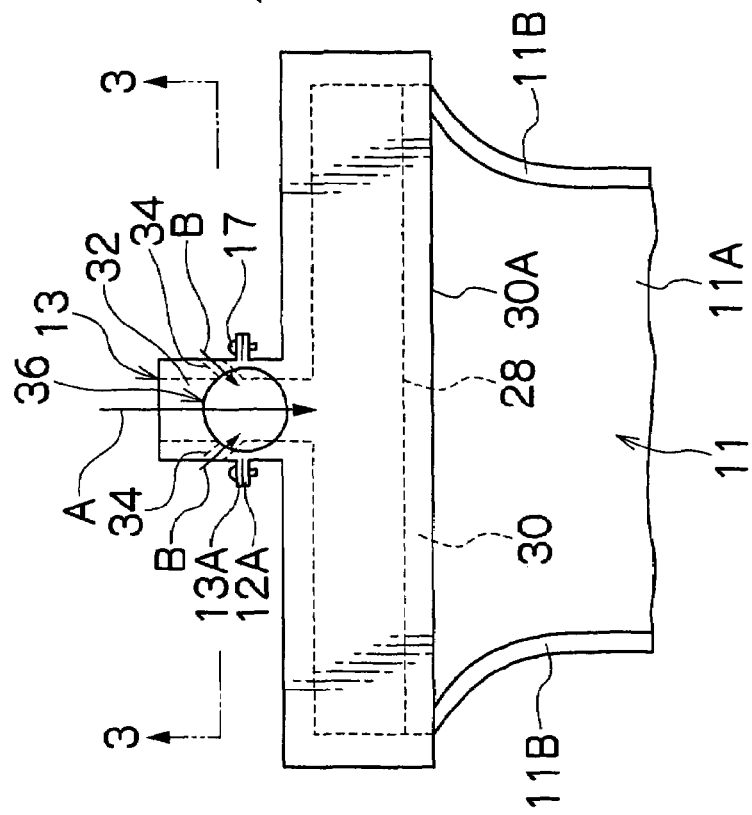
Figure 2C:
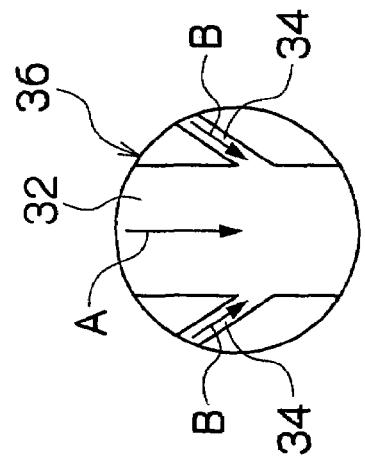
FIG. 2(c) is an enlarged view illustrating a joining part.

FIGS. 2(a), 2(b) and 2(c) illustrate an extruding die 12 with a feed block, and FIG. 2(a) is a front elevation of the extruding die 12, FIG. 2(b) is a side elevation of the extruding die 12, and FIG. 2(c) is an enlarged view illustrating a joining part 36, respectively.

Figure 3:
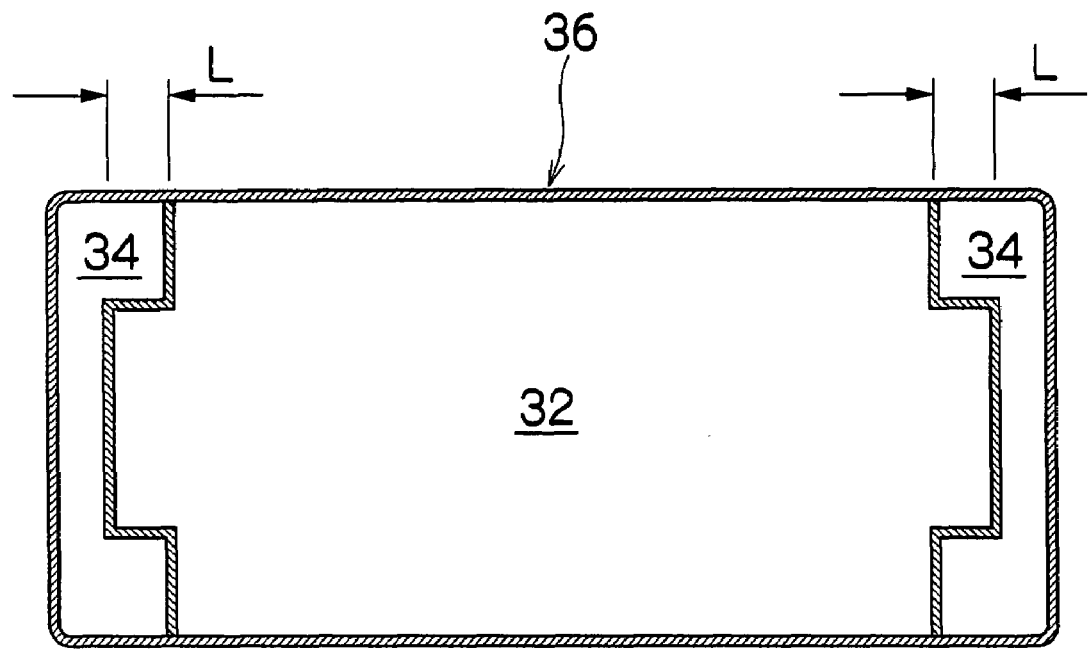
FIG. 3 is a sectional view showing a cross-sectional shape of the joining part of the feed block.
Figure 4:
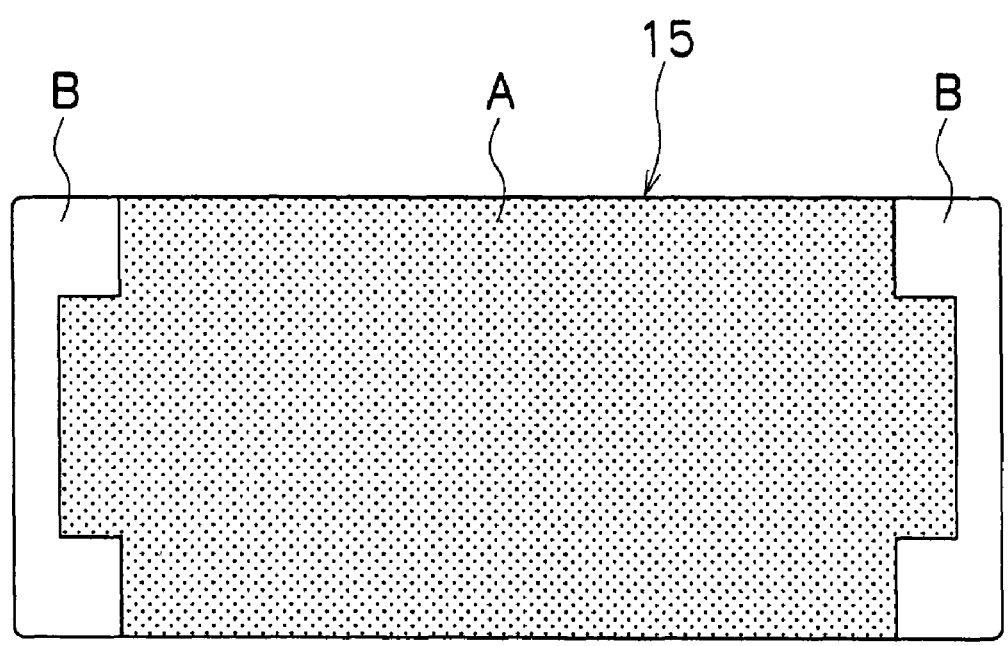
FIG. 4 is a cross-sectional view of a lamination resin formed by the joining part of the feed block.

As shown in FIGS. 2(a) and 2(b), the feed block 13 is detachably attached to the extruding die 12 by fastening each other's flange parts 13A, 12A with bolts 17. In the inside of the feed block 13, a trunk flow path 32, through which a resin A for the middle portion for forming a resin film main body 11A arranged in the middle portion of the resin film 11 in terms of its width direction flows, a pair of branch flow paths 34, 34, through which a resin B for the edge portions for forming both edge portions 11B of the resin film 11 in terms of its width direction flows, and a joining part 36, in which the pair of branch flow paths 34 join the trunk flow path 32, are formed. The joining part 36 is formed so that its cross section has such a shape as a pair of recessed branch flow paths 34 are fitted on the respective projecting edges of the trunk flow path 32, as shown in FIG. 3 (a cross-sectional view of the joining part 36 taken along the line 3-3 of FIG. 2(a)). This shape allows the resin A for the middle portion, which flows through the trunk flow path 32, and the resin B for the edge portions, which flows through the pair of branch flow paths 34, to join together at the joining part 36 and, as shown in FIG. 4, the resin B for the edge portions is applied to the side edge portions of the resin film main body 11A in such a manner as to enclose the side edges of the resin film main body with the resin B. A lamination resin 15 having been formed by lamination at the joining part 36 (refer to FIG. 4) is fed from the joining part 36 to the extruding die 12. The feed block 13 is so constructed that any one of a plurality of joining part blocks 13D having respective joining parts different in degree of enclosing the resin A for the middle portion with the resin B for the edge portions can be detachably attached thereto and any one of the joining part blocks 13D which specify the joining configuration is exchangeable for another depending on the condition under which resin films are formed. As for the exchange structure provided to the feed block 13 with which one joining part block 13D can be exchanged for another, for example, a structure can be suitably used which comprises a feed block main body 13B and a penetration 13C formed laterally in the feed block main body 13B and whose penetration 13C a joining part block 13D is inserted into or drawn out. A closure plate 13E for closing one end of the penetration 13C is detachably attached to the feed block main body 13B by, for example, bolting. The closure plate 13E may be provided on both ends of the penetration 13C. A plurality of joining part blocks 13D having respective joining parts 36 different in degree (L) to which the resin A for the middle portion is enclosed with the resin B for the edge portions are prepared and a joining part block 13D, which specifies the joining configuration, is exchanged for a more suitable one depending on the condition under which resin films are formed, such as difference in MFR between the resin A for the middle portion and the resin B for the edge portion, difference in extrusion rate between the resin A for the middle portion and the resin B for the edge portion, difference in resin temperature between the resin A for the middle portion and the resin B for the edge portions and the width of the resin film 11.

Figure 5:
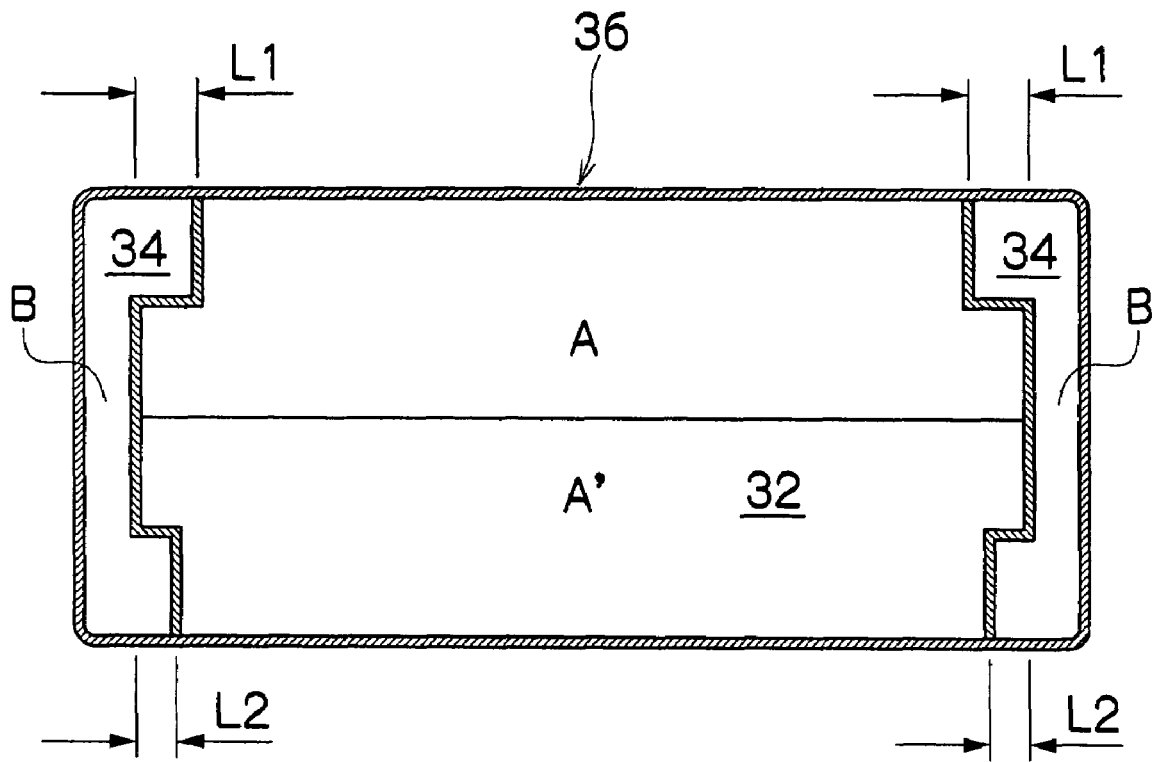
FIG. 5 is a sectional view showing another cross-sectional shape of the joining part of the feed block.

When the resin film main body 11A is made up of two layers using two kinds of resins A and A' for the middle portion, preferably the degree ($L_1$) and ($L_2$) to which the resins A and A' are enclosed with the resin B for the edge portions are changed as shown in FIG. 5, depending on the physical properties of the resins and the condition under which the resins are applied. This is because the film separation tendency of the resins and the disorder at the boundary between the resins differ depending on the difference in MFR between the resins, the difference in extrusion rate between the resins, the difference in resin temperature between the resins and the width of the resin film 11. The relationship between the physical properties of the resins or the applying condition and the degree (L) to which the resin A for the middle portion is enclosed with the resin B for the edge portions can be obtained by conducting tests.

As shown in FIGS. 2(a) and 2(b), the extruding die 12 comprises a manifold 28 and a slit 30, and the lamination resin 15 fed into the extruding die 12 is spread in the width direction of the extruding die 12 (the width direction of the resin film 11), run through the slit 30 and extruded from the extruding die 12 outside.

Then the method of forming a resin film according to an embodiment of the present invention will be described with reference to the apparatus 10 for forming a resin film which is constructed as described above.

First, as a preliminary, a joining part block 13D having a suitable joining part 36 is selected depending on the differences in MFR, extrusion rate and resin temperature between the resin A for the middle portion and the resin B for the edge portions and the width of the resin film 11 and then fitted to the feed block main body 13B. Then the resin A for the middle portion and the resin B for the edge portions are fed to the feed block 13. The resin A may consist essentially of a single kind of resin to form a single layer, or may consist essentially of a plurality of kinds of resins to form a plurality of layers, and may comprise at least one kind of resin to form at least one layer and inorganic pigments, additives or the like. The resin B for the edge portions may consist essentially of at least one kind of resin, and may comprise at least one kind of resin and additives; however, taking into account the recyclability of trimmed-off selvages, the resin B preferably consists essentially of a single kind of resin.

The resin A for the middle portion and the resin B for the edge portions both having been fed to the feed block 13 are joined and layered together in the molten state at their melting points or higher at the joining part 36 and fed to the extruding die 12 as the lamination resin 15 whose middle portion is formed of the resin A for the middle portion and edge portions are formed of the resin B for the edge portion. The lamination resin 15 having been fed into the extruding die 12 is spread in the width direction of the extruding die 12 (the width direction of the resin film 11) in the manifold 28, run through the slit 30 and extruded as the resin film 11 from the extruding die 12 outside. The resin film 11 having been extruded from the extruding die 12 is oxidized with oxidizing gases such as air and ozone so that it can sufficiently adhere to the support 22, which is conveyed from the upstream and nipped between the cooling roller 14 and the nip roller 16, and is then applied to the support 22. The resin film 11 having been applied to the support 22 is fully cooled with the cooling roller 14 and detached from the cooling roller 14 with the film detaching roller 18. Thus, the film-like laminate 27 made up of the support 22 laminated with the resin film 11 is produced. The film-like laminate 27 thus produced is made to be an end product by trimming off the selvages thereof in the post-processing.

In the present embodiment, since the resin A for the middle portion and the resin B for the edge portions are joined together at the joining part 36 of the feed block 13 in such a manner as to enclose both side edges in the crosswise direction of the resin film main body 11A, which is formed of the resin A, with the resin B, the disorder occurring at the boundary between the resin A for the middle portion and the resin B for the edge portions can be reduced while preventing the film separation of the resins A and B constituting the resin film 11. This makes it possible to avoid the inclusion of the resin A for the middle portion in the trimmed off selvages as much as possible, which in turn increases the recyclability of the selvages, and the yield and the productivity of the product.

Further, since the feed block 13 is so constructed that any one of a plurality of joining part blocks 13D, which have been prepared depending on the condition under which resin films is formed, is exchangeably attached to the feed block main body 13B and any one of the joining part blocks 13D having a suitable joining part 36 for the condition under which the resin film 11 is formed can be used, not only the film separation of the resin A for the middle portion and the resin B for the edge portions can be prevented reliably, but also the disorder at the boundary between the resins can be reduced effectively. This contributes to further increase in recyclability and productivity of resin films.

While the embodiment of the present invention has been described taking the case of the film-like laminate 27, which is made up of the support 22 laminated with the resin film 11, the present invention may be applied to the case of a resin film 11 alone, namely a resin film not applied to a support 22. In short, the present invention is applicable to any methods and apparatuses for forming a resin film in which different kinds of resins are joined.

The resin A for the middle portion and the resin B for the edge portions can be joined together in the extruding die 12; however, when joining them in the extruding die 12, if the extrusion of the resin film is carried out at high speed, the film separation becomes likely to occur, and in addition, the joining part of the extruding die 12 becomes hard to change depending on the condition, such as physical properties of the resins and applying condition under which resin films are formed.

EXAMPLE

In the following, the test results will be described of the examples with reference to Table 1 in which joining methods according to embodiments of the present invention were used and of Comparative Examples in which conventional joining methods were used. The resins used for the tests were as follows.

Comparative Example 1

Figure 6:
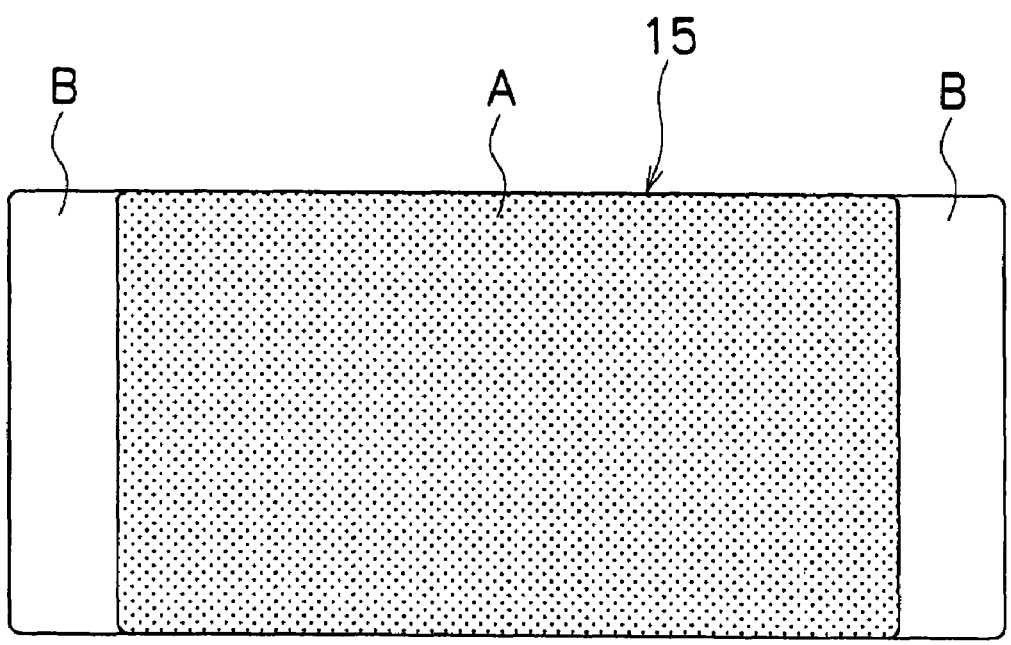
FIG. 6 is a cross-sectional view of a lamination resin formed in Comparative Example 1.

A mixture of a melt of low-density polyethylene of 90% by weight with an MFR of 10 g/10 min and a density of 0.917 g/cm$^3$ and titanium oxide of 10% by weight, obtained at a resin temperature of 325° C. was used as a resin A for the middle portion. The same melt of low-density polyethylene as above, which had no titanium oxide mixed therein, was used as a resin B for the edge portion. The resin A for the middle portion and the resin B for the edge portions were joined and layered together in the feed block 13 and extruded through the extruding die 12 of 1 meter in width to form a resin film 11. The feed block 13 used was such that its joining part 36 was to form a lamination resin 15 in which the boundary between the resin A for the middle portion and the resin B for the edge portions was a straight line, as shown in FIG. 6.

Example 1

Figure 7:
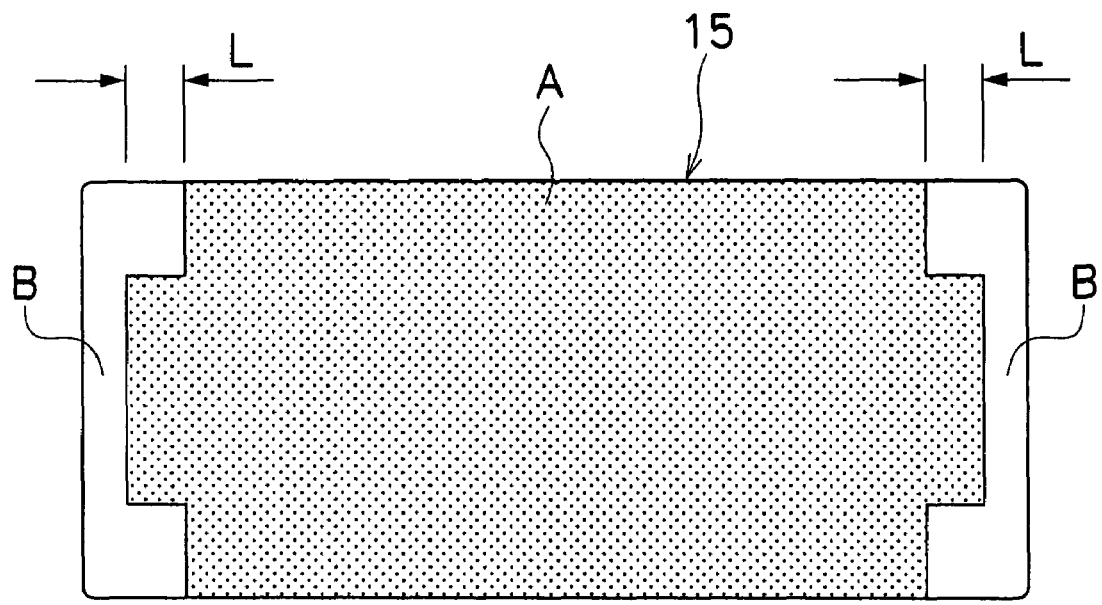
FIG. 7 is a cross-sectional view of a lamination resin formed in Example 1.

The same resin A for the middle portion, the same resin B for the edge portion, along with the same extruding die of 1 meter in width as those of Comparative Example 1 were used. A feed block 13 used was such that its joining part 36 was to form a lamination resin 15 by the joining method according to an embodiment of the present invention in which the resin A for the middle portion and the resin B for the edge portions were joined together in such a manner as to enclose the side edge portions of the resin film main body 11A, which was formed of the resin A for the middle portion, in the resin B for the edge portion, as shown in FIG. 7.

Comparative Example 2

A mixture of a melt of low-density polyethylene of 90% by weight with an MFR of 10 g/10 min and a density of 0.917 g/cm$^3$ and titanium oxide of 10% by weight, obtained at a resin temperature of 325° C. was used as a resin A for the middle portion. A melt of low-density polyethylene with an MFR of 3 g/10 min and a density of 0.919 g/cm$^3$ was used as a resin B for the edge portion. A die system in which the resin A for the middle portion and the resin B for the edge portions were joined at and extruded through an extruding die 12 of 1 meter in width was used to form a lamination resin 15 in which the boundary between the resin A for the middle portion and the resin B for the edge portions was a straight line, as shown in FIG. 6.

Example 2

The same resin A for the middle portion, the same resin B for the edge portion, along with the same extruding die 12 of 1 meter in width as those of Comparative Example 2 were used. The resin A for the middle portion and the resin B for the edge portions were joined and layered in a feed block 13 and extruded through the extruding die 12 to form a resin film 11. The feed block 13 used was such that its joining part 36 was to form a lamination resin 15 as shown in FIG. 7 by the joining method according to an embodiment of the present invention.

Comparative Example 3

Figure 8:
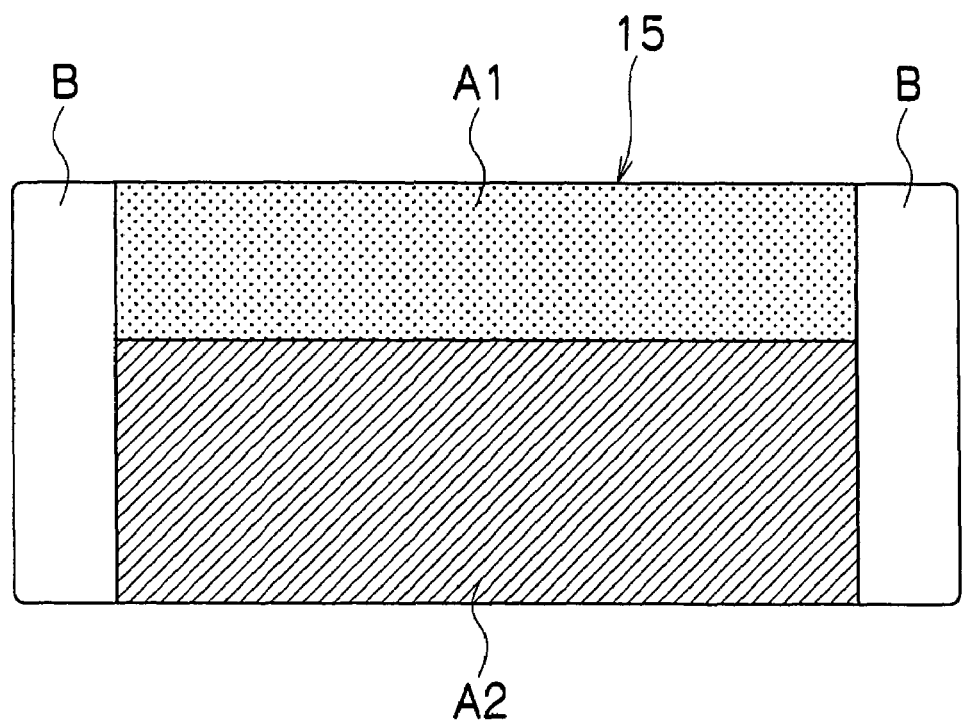
FIG. 8 is a cross-sectional view of a lamination resin formed in Comparative Example 3.

Two kinds of mixtures of a melt of low-density polyethylene of 95% by weight with an MFR of 10 g/10 min and a density of 0.917 g/cm$^3$ and titanium oxide of 5% by weight, and the same melt of low-density polyethylene of 90% by weight and titanium oxide of 10% by weight, obtained at a resin temperature of 325° C. were used as resins $A_1$ and $A_2$ for the middle portion. The resins $A_1$ and $A_2$ were layered at a thickness ratio of 1:2. A melt of low-density polyethylene with an MFR of 10 g/10 min and a density of 0.917 g/cm$^3$ was used as a resin B for the edge portion. The resins $A_1$ and $A_2$ for the middle portion and the resin B for the edge portions were joined and layered in the feed block 13 and extruded through the extruding die 12 of 1 meter in width to form a resin film 11. The feed block 13 used was such that its joining part 36 was to form a lamination resin 15 in which the boundary between the resins $A_1$ and $A_2$ for the middle portion and the resin B for the edge portions was a straight line, as shown in FIG. 8.

Example 3

Figure 9:
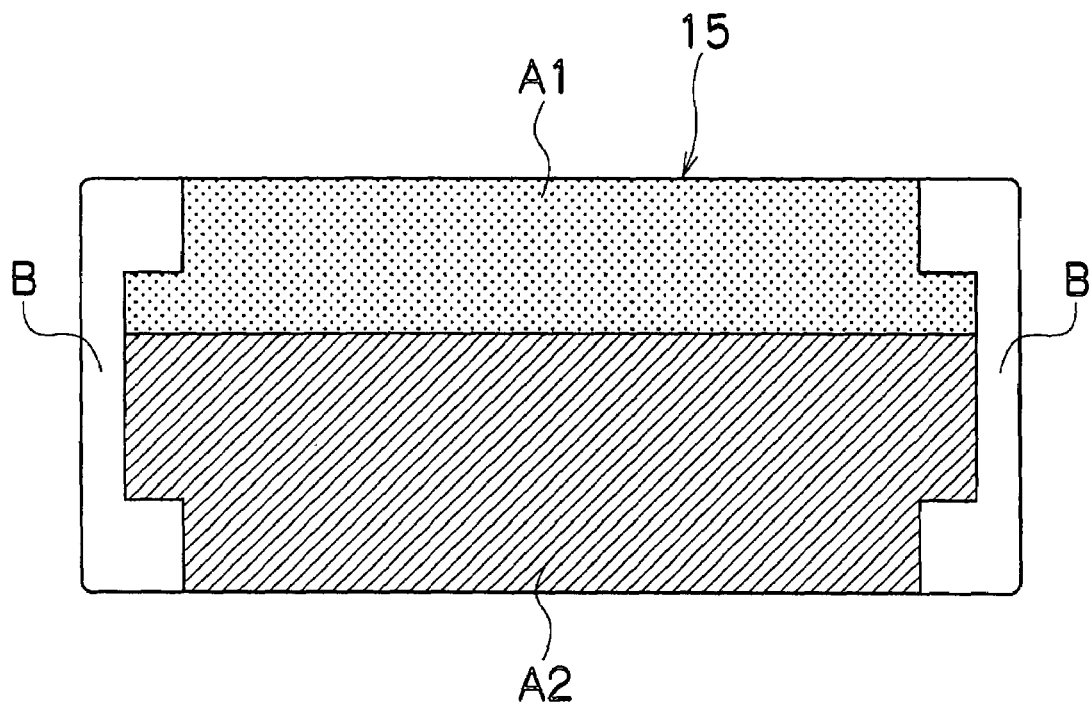
FIG. 9 is a cross-sectional view of a lamination resin formed in Example 3.

The same resins $A_1$ and $A_2$ for the middle portion, the same resin B for the edge portion, along with the same extruding die 12 of 1 meter in width as those of Comparative Example 3 were used. The resins $A_1$ and $A_2$ for the middle portion and the resin B for the edge portions were joined and layered in a feed block 13 and extruded through the extruding die 12 to form a resin film 11. The feed block 13 used was such that its joining part 36 was to form a lamination resin 15 as shown in FIG. 9 by the joining method according to an embodiment of the present invention.

Example 4

Figure 10:
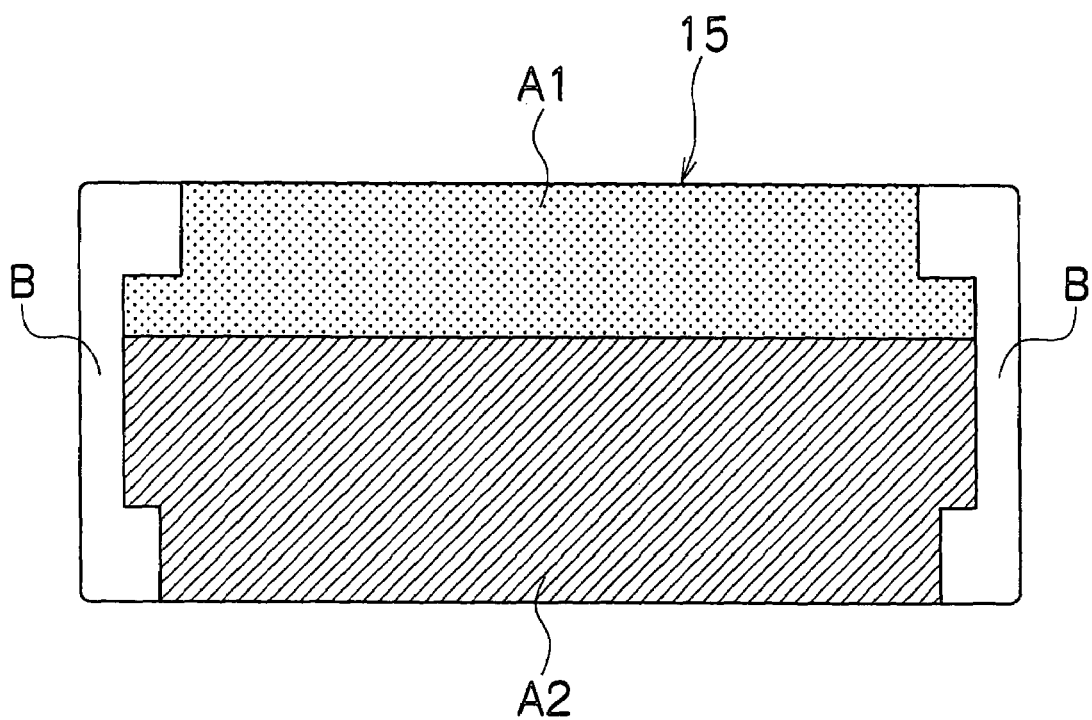
FIG. 10 is a cross-sectional view of a lamination resin formed in Example 4.

The same resins $A_1$ and $A_2$ for the middle portion, the same resin B for the edge portion, along with the same extruding die 12 of 1 meter in width as those of Comparative Example 3 were used. The resins $A_1$ and $A_2$ for the middle portion and the resin B for the edge portions were joined and layered in a feed block 13 and extruded through the extruding die 12 to form a resin film 11. The feed block 13 used was such that its joining part 36 was to form a lamination resin 15 by the joining method according to an embodiment of the present invention and in such a manner as to enclose resin $A_2$ for the middle portion, which contained a larger amount of titanium oxide, with the resin B to a smaller degree and the resin $A_1$ for the middle portion, which contained a smaller amount of titanium oxide, in the resin B to a larger degree, as shown in FIG. 10.

Comparative Example 4

This Comparative Example was carried out under the same condition as that of Comparative Example 1, except that an extruding die of 2 meters in width was used.

Example 5

Figure 11:
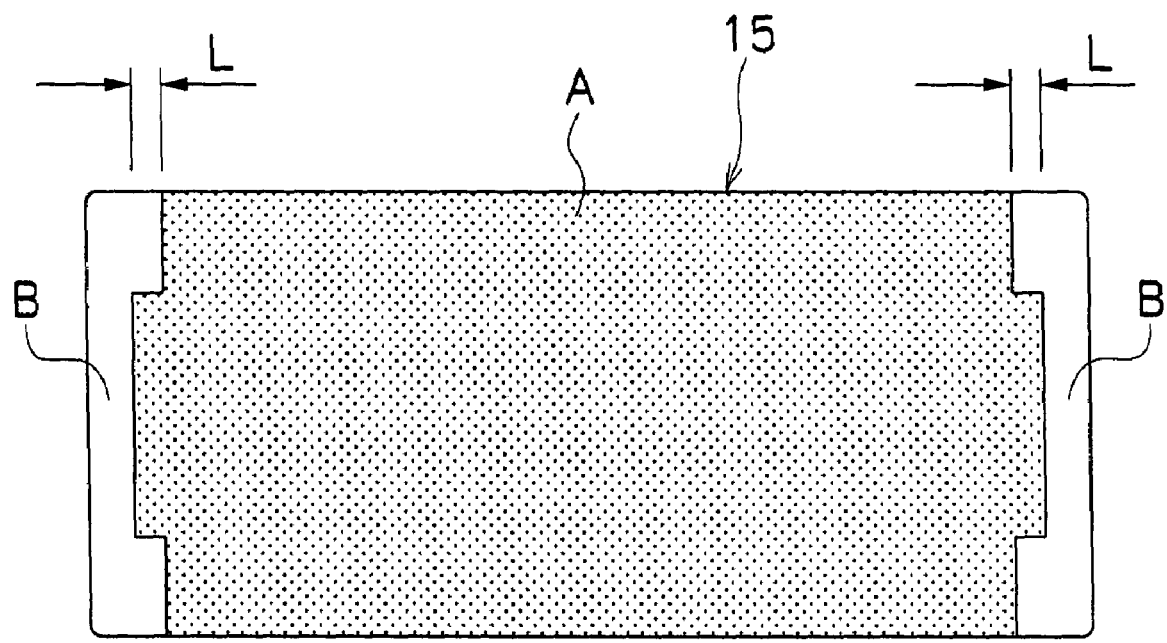
FIG. 11 is a cross-sectional view of a lamination resin formed in Example 5.
Figure 12:
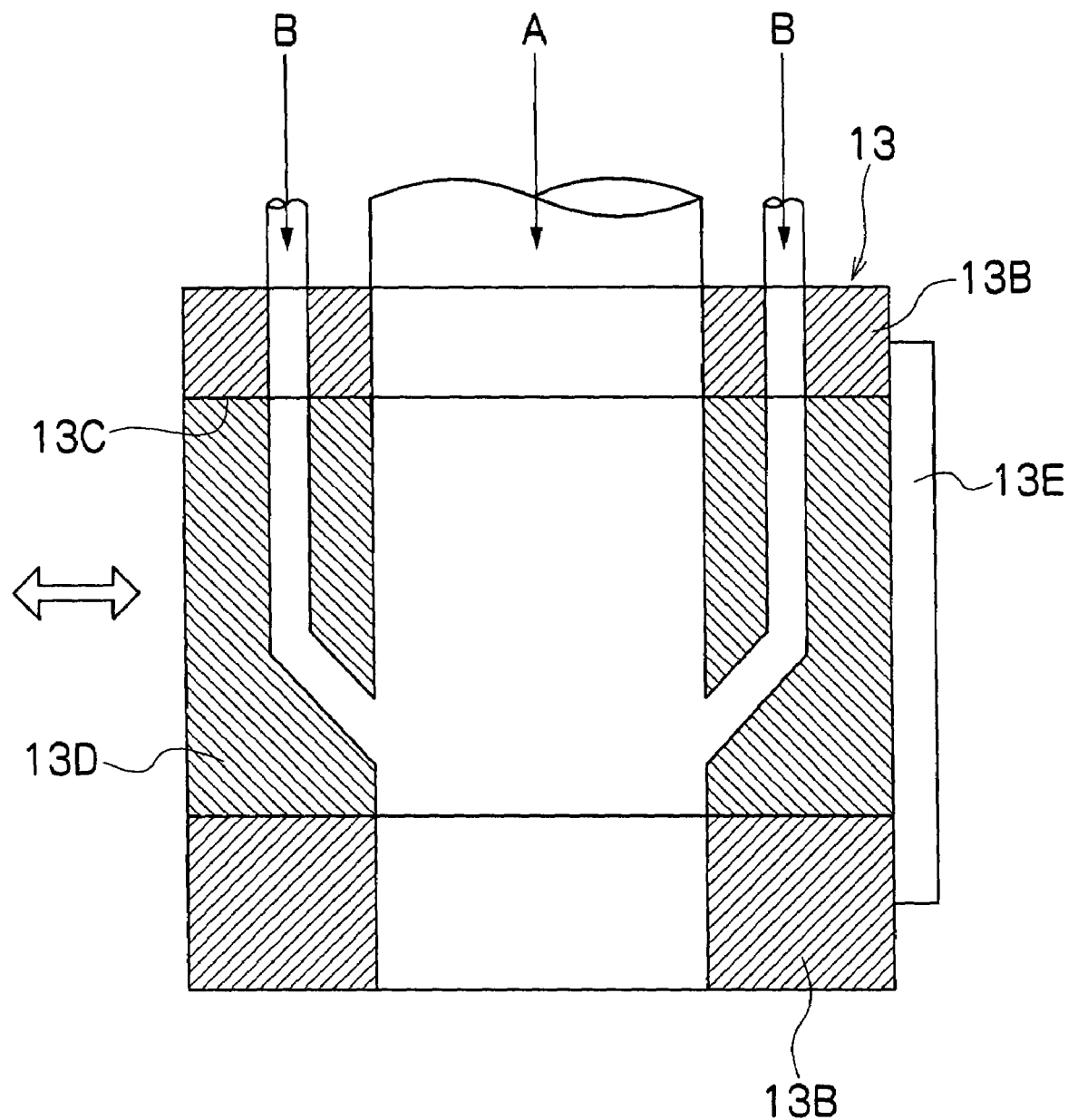
FIG. 12 is a sectional view showing one example of exchange structure provided to the feed block main body with which one joining part block can be exchanged for another.

The same resin for the middle portion, the same resin for the edge portions, along with the same extruding die as those of Comparative Example 4 were used. The feed block used was such that its joining part was to form a resin film in such a manner as to enclose the resin for the middle portion with the resin for the edge portions to a smaller degree, as shown in FIG. 11, compared with that shown in FIG. 7.

TABLE 1

| | Resin Used | Width-Direction Layering System | Die Width | Joining Configuration | Film Separation of Resins | Disorder at Boundary between Resins |
|---|---|---|---|---|---|---|
| Comparative Example 1 | A: MFR 10 g/10 min plus titanium oxide 10 wt % B: MFR 10 g/10 min | Feed block system | 1 m | FIG. 6 | None | Rather observed |
| Example 1 | A: MFR 10 g/10 min plus titanium oxide 10 wt % B: MFR 10 g/10 min | Feed block system | " | FIG. 7 | None | Small |

TABLE 1-continued

| | Resin Used | Width-Direction Layering System | Die Width | Joining Configuration | Film Separation of Resins | Disorder at Boundary between Resins |
|---|---|---|---|---|---|---|
| Comparative Example 2 | A: MFR 10 g/10 min plus titanium oxide 10 wt % <br> B: MFR 3 g/10 min | Die system | " | FIG. 6 | Observed | Small |
| Example 2 | A: MFR 10 g/10 min plus titanium oxide 10 wt % <br> B: MFR 3 g/10 min | Feed block system | " | FIG. 7 | None | Small |
| Comparative Example 3 | $A_1$: MFR 10 g/10 min plus titanium oxide 5 wt % <br> $A_2$: MFR 10 g/10 min plus titanium oxide 10 wt % <br> B: MFR 10 g/10 min | Feed block system | " | FIG. 8 | None | Large |
| Example 3 | $A_1$: MFR 10 g/10 min plus titanium oxide 5 wt % <br> $A_2$: MFR 10 g/10 min plus titanium oxide 10 wt % <br> B: MFR 10 g/10 min | Feed block system | " | FIG. 9 | None | Rather observed |
| Example 4 | $A_1$: MFR 10 g/10 min plus titanium oxide 5 wt % <br> $A_2$: MFR 10 g/10 min plus titanium oxide 10 wt % <br> B: MFR 10 g/10 min | Feed block system | " | FIG. 10 | None | Small |
| Comparative Example 4 | A: MFR 10 g/10 min plus titanium oxide 10 wt % <br> B: MFR 10 g/10 min | Feed block system | 2 m | FIG. 6 | None | Large |
| Example 5 | A: MFR 10 g/10 min plus titanium oxide 10 wt % <br> B: MFR 10 g/10 min | Feed block system | " | FIG. 11 | None | Rather observed |

As seen from the comparison between Comparative Example 1 and Example 1 shown in Table 1, when the boundary between the resin A for the middle portion and the resin B for the edge portions was made a straight line as in the case of Comparative Example 1, the disorder at the boundary between the resins was "rather observed", whereas when the joining method according to the embodiment of the present invention was adopted, like the case of Example 1, the disorder at the boundary between the resins could be reduced.

As seen from the comparison between Comparative Example 1 and Comparative Example 2, in the case of Comparative Example 2 where the difference in MFR between the resin A for the middle portion and the resin B for the edge portions was large, the film separation of the resins was more likely to occur, compared with the case of Comparative Example 1. However, if the joining method according to the embodiment of the present invention is adopted, like in the case of Example 2, not only the film separation can be prevented, but also the disorder at the boundary between the resins can be reduced. Although, the die system was adopted in Comparative Example 2, even if the feed block system is adopted, the bigger the difference in MFR between the resins becomes, the more the film separation of the resin A for the middle portion and the resin B for the edge portions is likely to occur.

Further, as seen from the comparison between Comparative Example 1 and Comparative Example 3, in the case of Comparative Example 3 where the resin film main body 11A was made up of two layers, the resins $A_1$ and $A_2$ for the middle portion, the disorder at the boundary between the resins $A_1$ and $A_2$ and the resin for the edge portions B was larger compared with the case of Comparative Example 1. However, if the joining method according to the embodiment of the present invention is adopted, like in the case of Example 3, the disorder at the boundary between the resins can be reduced. Moreover like in the case of Example 4, if the joining method according to the embodiment of the present invention is adopted and, of the two-layered resins $A_1$ and $A_2$ for the middle portion, the resin $A_2$ containing a larger amount of titanium oxide is enclosed with the resin B for the edge portions to a smaller degree than the resin $A_1$ containing a smaller amount of titanium oxide, the disorder at the boundary between the resins can be much more reduced.

Further, as seen from the comparison between Comparative Example 1 and Comparative Example 4, when the width of the resin film 11 was increased, from 1 meter in Comparative Example 1 to 2 meters in Comparative Example 4 in width of the extruding die, the disorder at the boundary between the resins became large. However, if the joining method according to the embodiment of the present invention is adopted, like in the case of Example 5, the disorder at the boundary between the resins can be reduced. In the case of Example 5, the resin A was enclosed with the resin B to a smaller degree as shown in FIG. 11, compared with the case shown in FIG. 7.

These test results proved that adopting the joining methods according to the embodiments of the present invention made it possible to prevent the film separation of resins and reduce the disorder at the boundary between resins.

As described so far, according to the method and apparatus of forming a resin film of the present invention, the disorder at the boundary between the resins for the middle portion and for the edge portion, which constitute the resin film, can be reduced while preventing the film separation of the resins. This makes it possible to avoid the inclusion of the resin for the middle portion in the trimmed off selvages as much as possible, which in turn increases the recyclability of the selvages, and hence the yield and the productivity of the product.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of forming a resin film from a first resin for a middle portion to form a resin film main body of the resin film and a second resin for edge portions to form both side edge portions in a crosswise direction of the resin film, the method comprising the steps of:

joining the first resin and the second resin in such a manner as to enclose only both side edges in the crosswise direction of the first resin for the middle portion which is formed as a cross-section convex shape with the second resin for the edge portions which is formed as a cross-section concave shape and to form a boundary of the first resin and the second resin; and extruding the joined resins through an extruding die to form the resin film, wherein the first and second resins are joined by being fed through a feed block which includes a joining part having a specific cross-sectional shape in such a manner as to enclose only both side edges in the crosswise direction of the resin film main body which is formed as a cross-section convex shape with the resin for the edge portions which is formed as a cross-section concave shape, and wherein the joining part is formed so that the cross-sectional shape is shaped as a pair of recessed branch flow paths that are fitted on respective projecting edges of a trunk flow path.

2. The method as defined in claim 1, wherein a degree of enclosing the first resin for the middle portion with the second resin for the edge portions is adjusted according to a difference in melt flow rate between the resins.

3. The method as defined in claim 1, wherein a degree of enclosing the first resin for the middle portion with the second resin for the edge portions is adjusted according to a difference in extrusion rate between the resins.

4. The method as defined in claim 1, wherein a degree of enclosing the first resin for the middle portion with the second resin for the edge portions is adjusted according to a difference in resin temperature between the resins.

5. The method as defined in claim 1, wherein a degree of enclosing the first resin for the middle portion with the second resin for the edge portions is adjusted according to a width of the resin film.

* * * * *